(12) United States Patent
Nachimuthu et al.

(10) Patent No.: US 11,893,379 B2
(45) Date of Patent: Feb. 6, 2024

(54) INTERFACE AND WARM RESET PATH FOR MEMORY DEVICE FIRMWARE UPGRADES

(71) Applicant: Intel Corporation, Santa Clara, CA (US)

(72) Inventors: Murugasamy K. Nachimuthu, Beaverton, OR (US); Deepak Gandiga Shivakumar, Hillsboro, OR (US); Dan Williams, Forest Grove, OR (US); Tiffany Kasanicky, Longmont, OR (US); Krzysztof Rusocki, Ciechocinek (PL); Nicholas Moulin, Longmont, CO (US); Mohan J. Kumar, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 584 days.

(21) Appl. No.: 16/995,934

(22) Filed: Aug. 18, 2020

(65) Prior Publication Data

US 2021/0357204 A1  Nov. 18, 2021

Related U.S. Application Data

(60) Provisional application No. 63/025,587, filed on May 15, 2020.

(51) Int. Cl.
| | |
|---|---|
| *G06F 8/654* | (2018.01) |
| *G06F 8/656* | (2018.01) |
| *G06F 9/4401* | (2018.01) |
| *G06F 9/48* | (2006.01) |

(52) U.S. Cl.
CPC ............. *G06F 8/654* (2018.02); *G06F 8/656* (2018.02); *G06F 9/4401* (2013.01); *G06F 9/4881* (2013.01)

(58) Field of Classification Search
CPC ............. G06F 8/654; G06F 8/656; G06F 8/65
USPC .................................................. 717/120–178
See application file for complete search history.

(56) References Cited

U.S. PATENT DOCUMENTS

| | | | |
|---|---|---|---|
| 7,500,095 B2* | 3/2009 | Mahmoud ............... | G06F 8/654 713/1 |
| 8,555,273 B1* | 10/2013 | Chia ....................... | G06F 8/654 717/172 |
| 10,430,263 B2* | 10/2019 | Polar Seminario ..... | H04L 67/34 |

(Continued)

OTHER PUBLICATIONS

Classen, Jiska, et al. "Anatomy of a vulnerable fitness tracking system: Dissecting the fitbit cloud, app, and firmware." Proceedings of the ACM on interactive, mobile, wearable and ubiquitous technologies 2.1 (2018): pp. 5:1-5:24. (Year: 2018).*

(Continued)

*Primary Examiner* — Satish Rampuria
(74) *Attorney, Agent, or Firm* — Jordan IP Law, LLC

(57) ABSTRACT

Systems, apparatuses and methods may provide for technology that exchanges activation information between system firmware and an operating system (OS), wherein the activation information includes one or more of status information, activation state information, capability information, activation time information or quiesce time information. The technology also conducts a runtime upgrade of the device firmware based on the activation information, wherein the runtime upgrade bypasses a reboot of the computing system.

25 Claims, 13 Drawing Sheets

(56) References Cited

U.S. PATENT DOCUMENTS

| | | | | |
|---|---|---|---|---|
| 2005/0223291 A1* | 10/2005 | Zimmer | .............. | G06F 11/1433 714/34 |
| 2007/0234332 A1* | 10/2007 | Brundridge | ............... | G06F 8/65 717/168 |
| 2018/0101376 A1* | 4/2018 | Olarig | ....................... | G06F 8/63 |
| 2018/0322076 A1 | 11/2018 | Prasad et al. | | |
| 2019/0243637 A1* | 8/2019 | Nachimuthu | ........... | G06F 8/656 |

OTHER PUBLICATIONS

Santos, Nuno, et al. "Using ARM TrustZone to build a trusted language runtime for mobile applications." Proceedings of the 19th international conference on Architectural support for programming languages and operating systems. 2014.pp. 67-80 (Year: 2014).*

Chen, Yu-Ting, Ting-Chou Chien, and Pai H. Chou. "Enix: a lightweight dynamic operating system for tightly constrained wireless sensor platforms." Proceedings of the 8th ACM Conference on Embedded Networked Sensor Systems. 2010.pp. 183-196 (Year: 2010).*

Aaraj, Najwa, et al. "Energy and execution time analysis of a software-based trusted platform module." 2007 Design, Automation & Test in Europe Conference & Exhibition. IEEE, 2007.pp. 1-6 (Year: 2007).*

Cheng, Zhuoqun, Richard West, and Ying Ye. "Building real-time embedded applications on QduinoMC: A web-connected 3D printer case study (outstanding paper)." 2017 IEEE Real-Time and Embedded Technology and Applications Symposium (RTAS). IEEE, 2017. pp. 13-24 (Year: 2017).*

Berger, Thorsten, et al. "A study of variability models and languages in the systems software domain." IEEE Transactions on Software Engineering 39.12 (2013): pp. 1611-1640 (Year: 2013).*

Extended European Search Report for European Application No. 20214390.5, dated Jun. 8, 2021, 13 pages.

Intel, "Intel Optane DC Persistent Memory Module (DCPMM)—DSM Interface", Revision V1.8, Oct. 2018, 61 pages.

* cited by examiner

80

Table 7-30: Device Capabilities 2 Register

| Bit Location | Register Description | Attributes |
|---|---|---|
| 3:0 | Completion Timeout Ranges Supported – This field indicates device Function support for the optional Completion Timeout programmability mechanism. This mechanism allows system software to modify the Completion Timeout value.<br><br>This field is applicable only to Root Ports, Endpoints that issue Requests on their own behalf, and PCI Express to PCI/PCI-X Bridges that take ownership of Requests issued on PCI Express. For all other Functions this field is Reserved and must be hardwired to 0000b.<br><br>Four time value ranges are defined:<br>  Range A: 50 μs to 10 ms<br>  Range B: 10 ms to 250 ms<br>  Range C: 250 ms to 4 s<br>  Range D: 4 s to 64 s<br>Bits are set according to the table below to show timeout value ranges supported.<br><br>0000b  Completion Timeout programming not supported – the Function must implement a timeout value in the range 50 us to 50 ms.<br>0001b  Range A<br>0010b  Range B<br>0011b  Ranges A and B<br>0110b  Ranges B and C<br>0111b  Ranges A, B, and C<br>1110b  Ranges B, C, and D<br>1111b  Ranges A, B, C, and D<br>All other values are Reserved.<br>It is strongly recommended that the Completion Timeout mechanism not expire in less than 10 ms. | Hwinit |

FIG. 5A

Table 7-31: Device Control 2 Register

| Bit Location | Register Description | Attributes |
|---|---|---|
| 3:0 | Completion Timeout Value – In device Functions that support Completion Timeout programmability, this field allows system software to modify the Completion Timeout value. This field is applicable to Root Ports, Endpoints that issue Requests on their own behalf, and PCI Express to PCI/PCI-X Bridges that take ownership of Requests issued on PCI Express. For all other Functions this field is Reserved and must be hardwired to 0000b.<br><br>A Function that does not support this optional capability must hardwire this field to 0000b and is required to implement a timeout value in the range 50 µs to 50 ms. Functions that support Completion Timeout programmability must support the values given below corresponding to the programmability ranges indicated in the Completion Timeout Ranges Supported field.<br><br>Defined encodings:<br><br>  0000b Default range: 50 µs to 50 ms<br><br>It is strongly recommended that the Completion Timeout mechanism not expire in less than 10 ms.<br><br>Values available if Range A (50 µs to 10 ms) programmability range is supported:<br><br>  0001b 50 µs to 100 µs<br>  0010b 1 ms to 10 ms<br><br>Values available if Range B (10 ms to 250 ms) programmability range is supported:<br><br>  0101b 16 ms to 55 ms<br>  0110b 65 ms to 210 ms<br><br>Values available if Range C (250 ms to 4 s) programmability range is supported:<br><br>  1001b 260 ms to 900 ms<br>  1010b 1 s to 3.5 s<br><br>Values available if the Range D (4 s to 64 s) programmability range is supported:<br><br>  1101b 4 s to 13 s<br>  1110b 17 s to 64 s<br><br>Values not defined above are Reserved.<br><br>Software is permitted to change the value in this field at any time. For Requests already pending when the Completion Timeout Value is changed, hardware is permitted to use either the new or the old value for the outstanding Requests, and is permitted to base the start time for each Request either on when this value was changed or on when each request was issued.<br><br>The default value for this field is 0000b. | RW |

112 — Exchange activation information between system firmware and an OS in a computing system, wherein the activation information includes one or more of status information, activation state information, capability information, activation time information or quiesce time information 114 — Conduct a runtime upgrade of memory device firmware based on the activation information, wherein the runtime upgrade bypasses a reboot of the computing system

122 — Determine whether memory initialization code associated with a computing system supports warm resets 124 — Supported?

Yes → 126 — Activate, by a BIOS, device firmware

No → 128 — Invoke a microcontroller to activate the device firmware

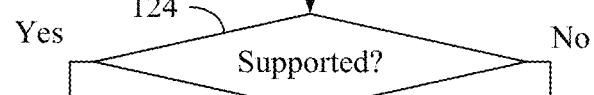

Execute the device firmware from the memory device

INTERFACE AND WARM RESET PATH FOR MEMORY DEVICE FIRMWARE UPGRADES

CROSS-REFERENCE TO RELATED APPLICATIONS

The present application claims the benefit of priority to U.S. Provisional Patent Application No. 63/025,587 filed on May 15, 2020.

TECHNICAL FIELD

Embodiments generally relate to firmware upgrades. More particularly, embodiments relate to an interface and warm reset path for memory device firmware upgrades.

BACKGROUND

Memory devices such as INTEL OPTANE Persistent Memory Module (PMem), also known as Persistent Memory, previously known as Intel® Optane™ Data Center Persistent Memory Module (DCPMM)) technology provides persistent memory and volatile memory and in conjunction with processor technologies, the system can support multiple memory modes such as 1LM, Memory Mode (2LM), and App-Direct. When Cloud Service Providers (CSPs) use this memory technology, the ability to upgrade DCPMM firmware to apply bug fixes, apply workarounds, and add telemetry debug/root cause issues without rebooting the system may be advantageous (e.g., to reduce service interruption for meeting Service Level Agreements (SLAs) with their end customers). In current deployments, firmware updates on the memory device require a reboot for new firmware to take effect.

BRIEF DESCRIPTION OF THE DRAWINGS

The various advantages of the embodiments will become apparent to one skilled in the art by reading the following specification and appended claims, and by referencing the following drawings, in which:

FIGS. 5A-5B are illustrations of examples of portions of a PCIe (Peripheral Component Interconnect Express) specification that defines completion timeout support;

FIG. 8A is a flowchart of an example of a method of operating a performance-enhanced computing system according to an embodiment;

FIG. 8B is a flowchart of an example of a method of conducting a warm reset according to an embodiment;

DESCRIPTION OF EMBODIMENTS

Figure 1:
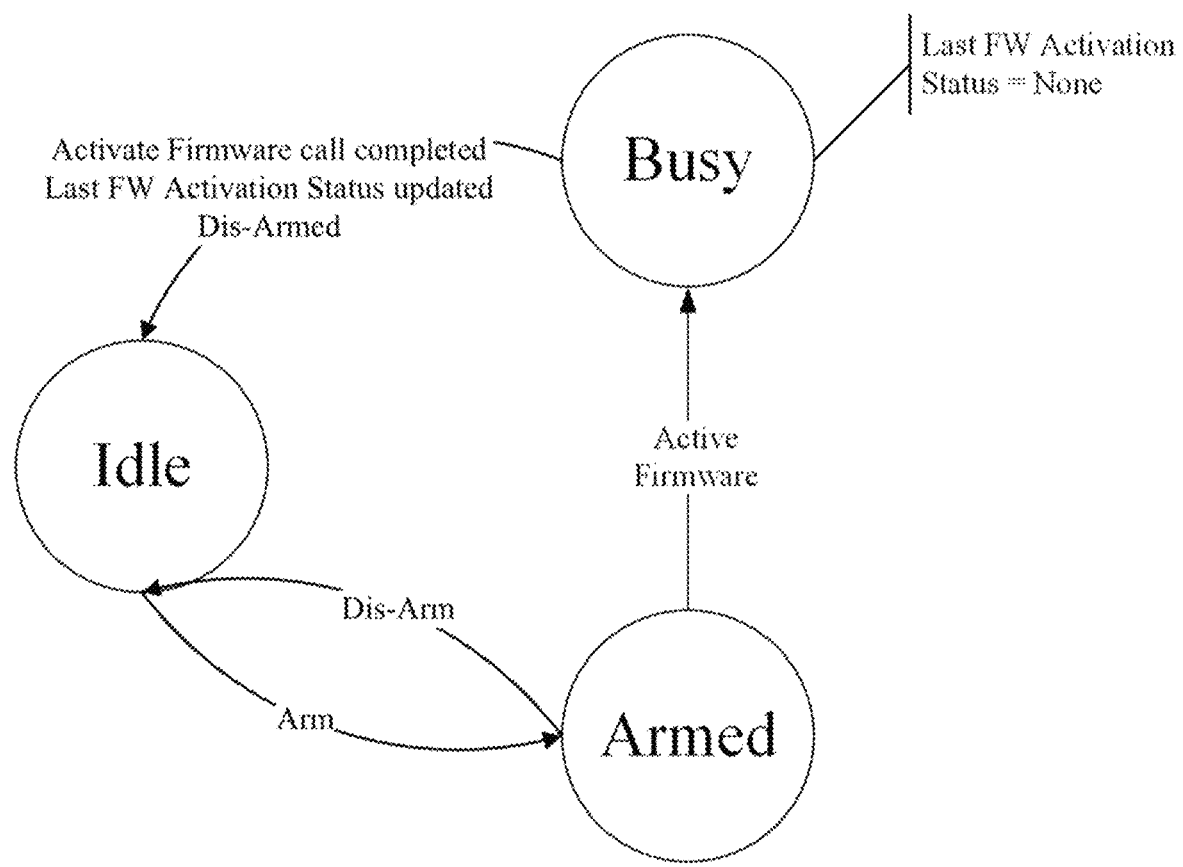
FIG. 1 is a state diagram of an example of firmware activation state transitions according to an embodiment.

Conventional solutions lack technology to upgrade memory device firmware during runtime. The NVMe (Non-Volatile Memory Express) standards offer a mechanism to upgrade NVMe device firmware without PCIe link reset and does not quiesce (e.g., pause) the host memory traffic from other input/output (I/O) devices. Therefore, the NVMe standards defined mechanism cannot be used for memory devices.

In future generations of memory devices, runtime firmware upgrades without reboot may be introduced.

The memory device runtime firmware upgrade could require memory accesses to be quiesced (e.g., for up to 500 msecs) to activate new firmware. I/O devices such as PCIe devices implement PCIe Completion Timeout (CTO) mechanism in which if request is made by I/O device to host memory or configuration access, if the access is not returned with-in the specified time as defined by the PCIe specification (example in FIG. 5), it will cause a PCIe CTO error. The error may result in system reset. Generally, the OS configures the PCIe devices to operate the devices in default PCIe completion timeout mode, that is in the order of 50 us to 50 ms. Quiescing memory access for more than 10 ms to 50 ms would result in I/O (input/output) device timeout, OS service timeout and/or system reboot. In order to deal with these timeouts during memory device firmware upgrade, platform firmware, OS and I/O devices need to be coordinated. Embodiments provide a mechanism to solve the OS and I/O timeout issue during the firmware upgrade.

In an embodiment, platform firmware (e.g., BIOS and/or UEFI (Unified Extensible Firmware Interface)) publishes memory device firmware upgrade capability information to the OS, along with the estimated firmware activation time including processor and I/O quiesce time. Once the memory device firmware(s) are staged, based on the information provided to the OS, the OS prepares for estimated processor and I/O quiesce timeout (e.g., either the OS conducts the I/O device quiesce or the platform firmware conducts the I/O device quiesce) and calls the platform firmware to activate memory device firmware. After the platform firmware completes the activation of the memory devices, the OS may restore the services back (e.g., re-evaluating interrupts, timers and re-starting I/O services, etc.) to continue operation.

The proposed solution enables memory technology customers/CSPs to deploy (e.g., via a user request) a runtime firmware upgrade solution without reboot. This solution improves the quality of platforms with memory technology products by providing memory technology firmware bugs fixes, workarounds, Reliability, Availability and Serviceability (RAS) solutions and enabling better debug/root cause solutions.

Theory of Operations

NVDIMM (non-volatile dual inline memory module) devices use firmware to carryout various initialization and runtime operation. After product qualification and deployment, often security, bug fixes, workarounds, telemetry to debug/root cause issues are addressed through firmware changes. To upgrade NVDIMM firmware, a system or NVDIMM reset may be required, which could result in long service down time. In order to reduce the downtime, runtime (e.g., without system reboot) activation of firmware is introduced.

Traditionally, in order to use and manage the NVDIMM, there have been interfaces defined in UEFI, ACPI (Advanced Configuration and Power Interface) and PMEM.io specs. Namely System Management BIOS (SMBIOS), ACPI E820, UEFI Get Memory Map, System Resource Affinity Table (SRAT), System Locality Distance Information Table (SLIT), NVDIMM Firmware Interface Table (NFIT), Heterogeneous Memory Attribute Table (HMAT) and Device Specific Method (DSM) interface. In one example, four DSMs are added to the NVDIMM DSM interface specification. Two DSM interfaces at NVDIMM root device level call:

Get Devices Runtime FW Activation Info
Activate Firmware

And two DSM interfaces at NVDIMM child leaf device level called:

Get Device Runtime FW Activation Status
Set Device Runtime FW Activation Arm State In other embodiments, interfaces with similar information and actions may also be used. For example, another example may assume that all devices are always armed instead of selectively arming the devices.

The NVDIMM firmware may be downloaded using either an existing DSM or OOB (out of band) or through a proprietary driver mechanism to the NVDIMM devices. If activating new firmware at runtime requires pausing host memory access, the OS understands the timing information and prepares itself before host memory access is paused and new NVDIMM firmware is activated. If the platform firmware is not capable of pausing memory traffic for the estimated amount of time, the OS may prepare itself to pause I/O memory traffic and give control to the platform firmware to activate new NVDIMM firmware. If NVDIMM firmware is activated one at a time, then the total estimated time to activate new firmware on the system would be total number of NVDIMMs in the system times the estimated activation time per NVDIMM. This result may not be tolerable for some OS services. Therefore, activating NVDIMM firmware in parallel may be done to reduce service interruption time. In an embodiment, the NVDIMM root level_DSMs assist in activating the NVDIMM firmware in parallel if possible.

If I/O devices are to be quiesced during firmware activation, the following options may be considered:

Live activation if platform firmware is capable of performing pausing I/O and processor access to host memory and activating new NVDIMM firmware.

Live activation if the OS can quiesce I/O device access to host memory either by disabling bus mastering or by pausing/hibernating host memory access of I/O devices to disable device bus mastering capability to host memory, and if platform firmware can pause processor access to host memory and activate new NVDIMM firmware.

Warm reset-based activation—Perform if the platform can support NVDIMM firmware activation during warm reset and the OS can tolerate a warm reset. In this case, I/O devices are going through reset resulting in naturally stopping the I/O device access to host memory.

System reset based activation—System reset causes activation of NVDIMM firmware.

The first three options involve platform firmware assistance in addition to OS assistance and the NVDIMMs are armed in order to activate the firmware. The platform firmware activation capability is available through a root "Get Devices Runtime FW Activation Info" DSM call.

Figure 2:
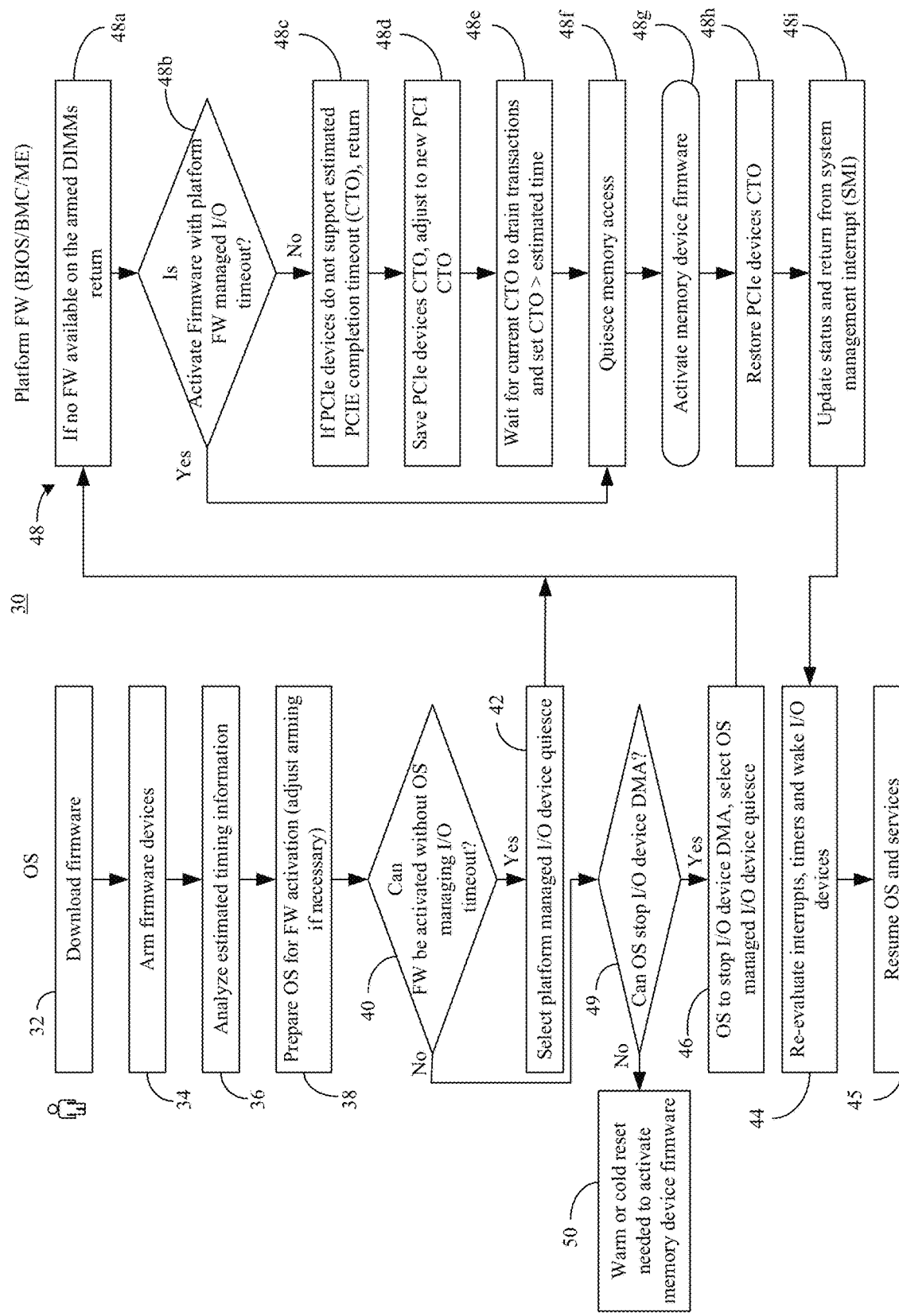
FIG. 2 is a flowchart of an example of a method of operating an operating system (OS) and platform firmware (FW) according to an embodiment.

FIG. 2 shows a system level flow 30 for memory device firmware activation with one or more of the embodiments. The following sequence provides example operations to activate a new firmware:

Process block 32 downloads new firmware to NVDIMMs (e.g., either using DSMs or through a proprietary mechanism).

Determine whether the platform supports runtime firmware activation by calling "Get Devices Runtime FW Activation Info" and checking the FW Activation Capability field. If individual DIMMs support runtime FW activation or shutdown is required for activation, the firmware may be retrieved through "Get FW Info" FW Update Capability field.

Process block 34 arms NVDIMMs using the child "Set Device Runtime FW Activation Arm State" function (optionally arming and getting estimated time could be done before downloading the firmware).

Process block 36 gets estimated times using root "Get Devices Runtime FW Activation Info".

Estimated time may vary depending on which NVDIMMs are armed.

The estimated timing provides estimated firmware activation time, estimated processor quiesce time during firmware activation and estimated I/O quiesce time during firmware activation. In an embodiment, the estimated activation time includes the processor and I/O quiesce time and the processor quiesce time includes the I/O quiesce time. If a DIMM requires I/O or processor quiesce during FW activation, the firmware may be retrieved through the "Get FW Info" FW Update Capability field.

If the Estimated I/O quiesce time is more than a platform supported Max I/O quiesce time, dis-arm some DIMMs and re-evaluate. If none are below the platform Max I/O quiesce time, live activation may not be possible:

Get the FW Activation Capability using the root "Get Devices Runtime FW Activation Info".

Process block 38 prepares the OS to invoke platform firmware to activate new NVDIMM firmware.

If the FW Activation Capability indicates in block 40 "live activation supported with platform firmware managed processor and I/O quiesce" and if OS can tolerate estimated timing:

the OS completes any pending PMem module mailbox accesses.

Process block 42 calls the root "Activate Firmware" blocks 48 (48a-48i) to activate firmware on the Armed NVDIMMs.

Wait for "FW Activation State" to become idle by polling the root "Get Devices Runtime FW Activation Info" method.

Determine firmware activation by calling "Get Devices Runtime FW Activation Info" on each Armed NVDIMM child method and checking "Last FW Activation Status".

Process block 44 re-evaluates the timer so that the OS time matches the wall clock time (e.g., elapsed real time) if OS uses SW (software) interrupts to manage the time.

If the FW Activation Capability block 40 indicates "live activation supported with OS managed I/O quiesce (device idle) and platform managed processor quiesce" and OS can bring I/O devices to idle:

The OS completes any pending PMem module mailbox accesses.

Process block 46 places I/O devices in the idle state (complete all existing bus mastering/DMA (direct memory access) cycles and stop initiating new bus mastering/DMA cycles by I/O devices).

Call the root "Activate Firmware" blocks 48 to activate firmware on the Armed NVDIMMs.

Wait for "FW Activation State" become idle by polling the root "Get Devices Runtime FW Activation Info" method.

Determine the firmware activation by calling "Get Devices Runtime FW Activation Info" on each Armed NVDIMM child method and checking "Last FW Activation Status".

Once the firmware activation is completed, the OS bring back I/O devices to the normal operational state.

Process block 44 re-evaluates the timer so that the OS time matches the wall clock time if OS uses SW interrupts to manage the time. Block 45 resumes OS and services.

If the FW Activation Capability indicates "warm reset-based activation supported" and OS can tolerate warm reset:

The OS prepares for warm reset.

Process block 50 invokes warm reset if block 49 determines that the OS cannot stop I/O device DMA.

The platform firmware activates the NVDIMM during warm reset flow.

When the OS is reloaded, the new NVDIMM firmware is in use.

If none of the above conditions are possible, system reset is required to activate the firmware.

On system reset, staged firmware is activated regardless of Arm state.

In one example, block 48*a* returns if there is no FW available on the armed DIMMs, where block 48*b* determines whether FW managed I/O timeout to be used. If not, block 48*c* may return if the PCIe devices do not support estimated PCIE completion timeout (CTO). In an embodiment, block 48*d* saves the PCIe devices CTO and adjusts to a new PCI CTO. Block 48*e* may wait for the current CTO to drain transactions and set the CTO to be greater than the estimated time. In an embodiment, block 48*f* quiesces memory access. Illustrated block 48*g* activates the memory device firmware, where the PCIe devices CTO is restored at block 48*h*. Block 48*i* may update the status and return from system management interrupt (SMI). If it is determined at block 48*b* that FW managed I/O timeout is not to be used, the root "Activate Firmware" blocks 48 may bypass blocks 48*c*-48*e* and proceed directly to block 48*f*.

FIG. 1 shows a state machine 20 with the firmware activation state transitions.

Not all PCIe devices may support I/O device completion timeouts greater than 10 msec (or Memory access time needed by memory device). In those cases, platform firmware may not be able to dynamically adjust the I/O device timeout and quiesce the system. In those situations, the estimated timeout will reflect the information through a DSM call and either the OS prevents the I/O devices from generating any DMA before calling the activate firmware or the OS performs a warm reset or cold reset to activate the new firmware.

Some Relevant Parameters in the DSM
NVDIMM root DSMs:
Get Devices Runtime FW Activation Info (output)
  Status
  Firmware Activate State
    Idle
    Armed
    Busy
  Firmware Capability
    Live activation supported with platform firmware managed processor and I/O quiesce
    Live activation supported with OS managed I/O quiesce (device idle) and platform managed processor quiesce
    Warm reset-based activation supported
    Cold reset activates new firmware
  Estimated Firmware Activation Time
  Estimated Firmware Quiesce Time for FW Activation
  Estimated I/O Access to Memory Quiesce Time for Firmware Activation
  Platform Firmware Supported Maximum I/O access to Memory Quiesce Time
Activate Firmware
  I/O Device State (input)
    Platform firmware managed I/O and processor quiesce
    OS managed I/O quiesce and platform firmware managed processor quiesce
  Status (output)
NVDIMM Child DSMs
Get Device Runtime FW Activation Status (output)
  Status
  Firmware Activation State
    Idle
    Armed
    Busy
Set Device Runtime FW Activation Arm State (input)
  Arm State
    Not Armed (Dis-Armed)
    Armed Although the above DSMs are used as example to describe the concept, the technology may be implemented using different DSM, ACPI or UEFI or proprietary driver model technology and pass similar information between OS and platform firmware to accomplish similar behavior. In any event, there is an information exchange between platform firmware and the OS, as well as platform firmware and OS behavior to update memory device firmware without a system reboot.

Figure 3:
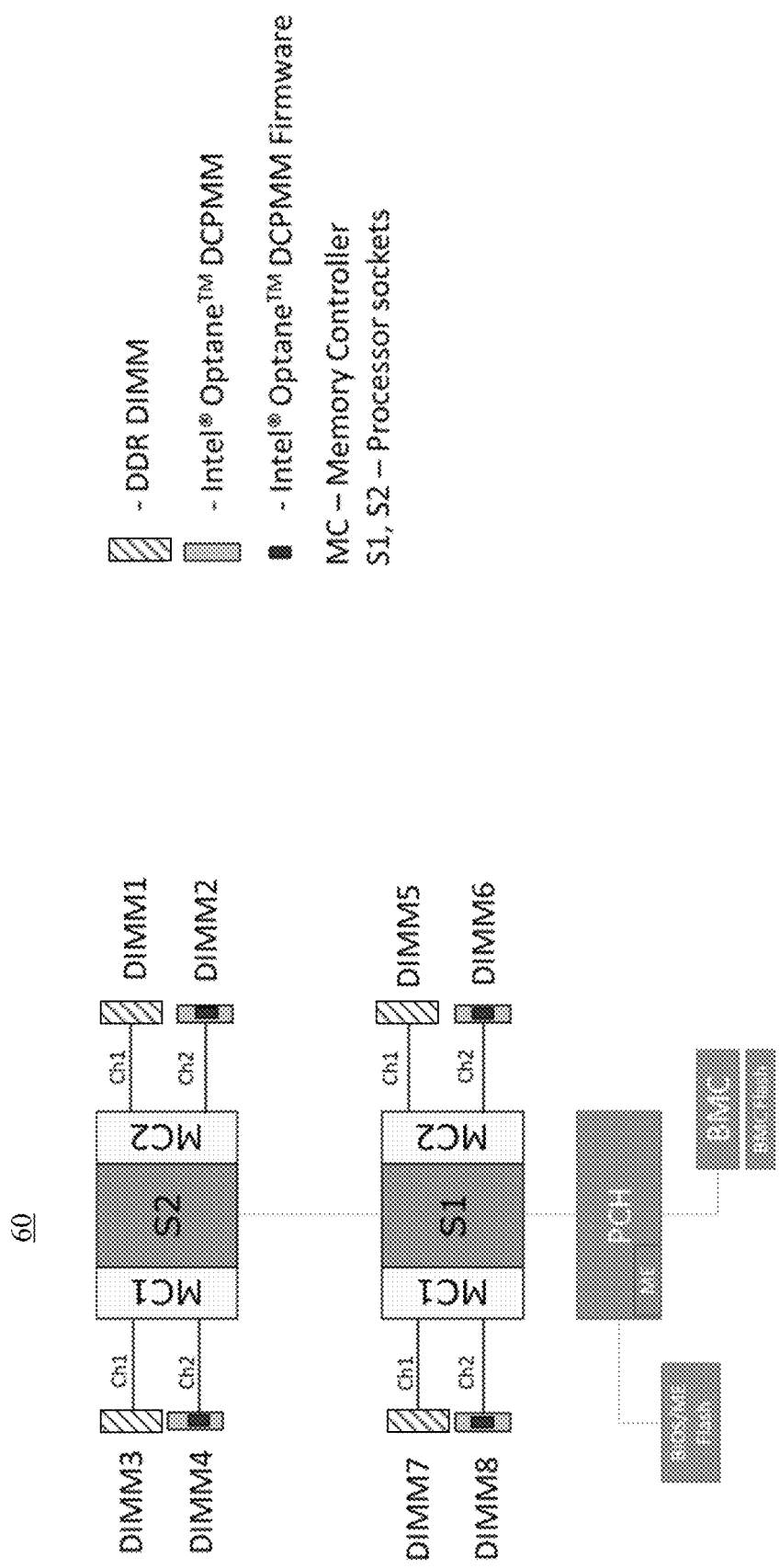
FIGS. 3 and 4 are block diagrams of examples of socket systems with different types of memory devices containing firmware according to embodiments.

FIG. 3 shows a two-socket system 60 with memory devices containing firmware.

Warm Resets

The memory device runtime firmware upgrade may involve memory accesses being quiesced for up to 500 msecs to activate new firmware. In current system deployments, most of the PCIe devices that are used today do not support PCIe device completion timeouts of more than 10 msec. None of the existing widely deployed OS (e.g., WINDOWS/LINUX) support stopping all of the I/O devices from performing DMA (direct memory access) during runtime to activate new firmware. Embodiments provide a mechanism for platform firmware to activate memory device firmware without losing OS memory contents and quickly to resume OS operation.

Platform firmware (BIOS/UEFI) publishes memory device firmware upgrade capability information to the OS along with the estimated firmware activation time including processor and I/O quiesce time.

Once the memory device firmware(s) are staged, the OS may arm the memory devices for firmware activation and invoke a warm reset or OS memory preserving warm reset to activate new firmware.

In an embodiment, the platform firmware (BIOS/BMC (baseboard management controller)) quiesces the memory traffic and activates new firmware in the warm reset path without losing OS memory contents.

The proposed solution enables wide deployment of memory technology firmware upgrades without requiring system reboot or while OS is alive (e.g., active).

Memory technology customers and CSPs can deploy memory the device firmware upgrade solution without OS content loss or reboot. This solution results in improved quality of platforms with memory technology products by providing memory technology firmware bugs fixes, workarounds, RAS solutions and enabling better debug/root cause solutions.

Figure 4:
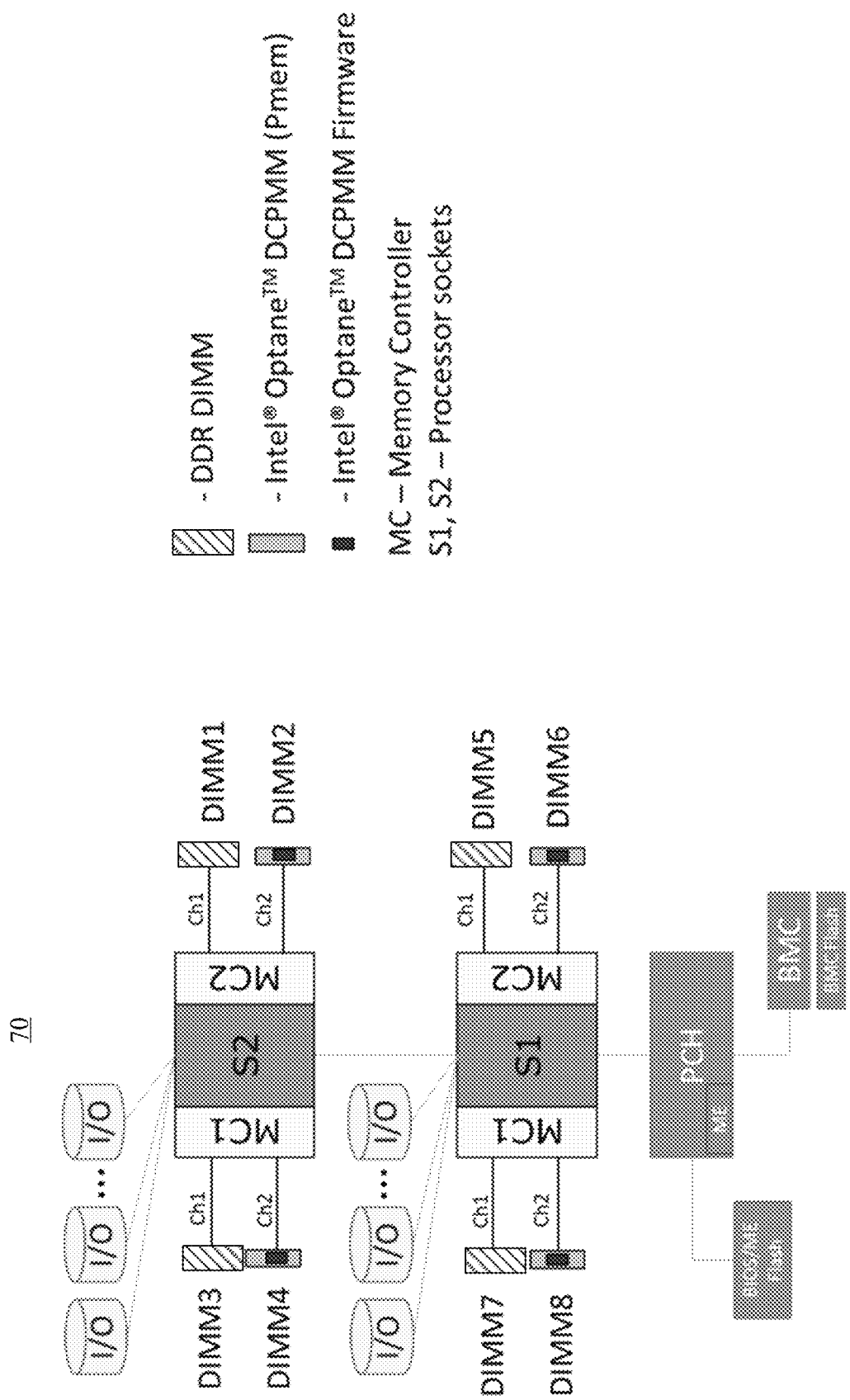

FIG. 4 shows a 2-socket computer system 70 with PMem memory devices containing firmware. Memory devices may be interleaved with other memory devices. Some memory devices may act as caching memory for other memory devices. Memory devices such as PMem may carry a memory device controller with firmware that supports the memory link initialization, error handling, power loss/failure handling, persistent memory, wear leveling, read/write disturb, Self-Monitoring, Analysis and Reporting Technology (SMART) information, security management, telemetry, RAS handling, etc.

When the firmware on the memory device is be upgraded without reboot, the memory traffic to the memory module may be quiesced to allow cases such as below:
New firmware security authentication
Saving current state of the memory device so that the new firmware can safely transition the state
During the transition from old firmware to new firmware, there is no firmware running to handle runtime operations such as:
Errors, power loss/failure, wear leveling, read/write disturb, SMART, etc.

These memory devices may be accessed by the processor or I/O devices that may not support the long timeout needed by the memory device to upgrade the firmware. For example, as shown in the specifications 80, 82 of FIGS. 5A-5B, some PCIe devices may not support PCIe completion timeout, leading to operate only in default 50 us-50 ms range or some may support only PCIe Completion timeout Range A and B and some may support all the ranges. Even if the devices support the entire Range ABCD, the OS might have configured the devices to operate in a default range or Range A. In such a case, for example, if the memory device traffic is to be quiesced for 500 ms range, an error resulting in a system error may occur. In some cases, the processor may not support memory traffic quiesce support during runtime.

Figure 6:
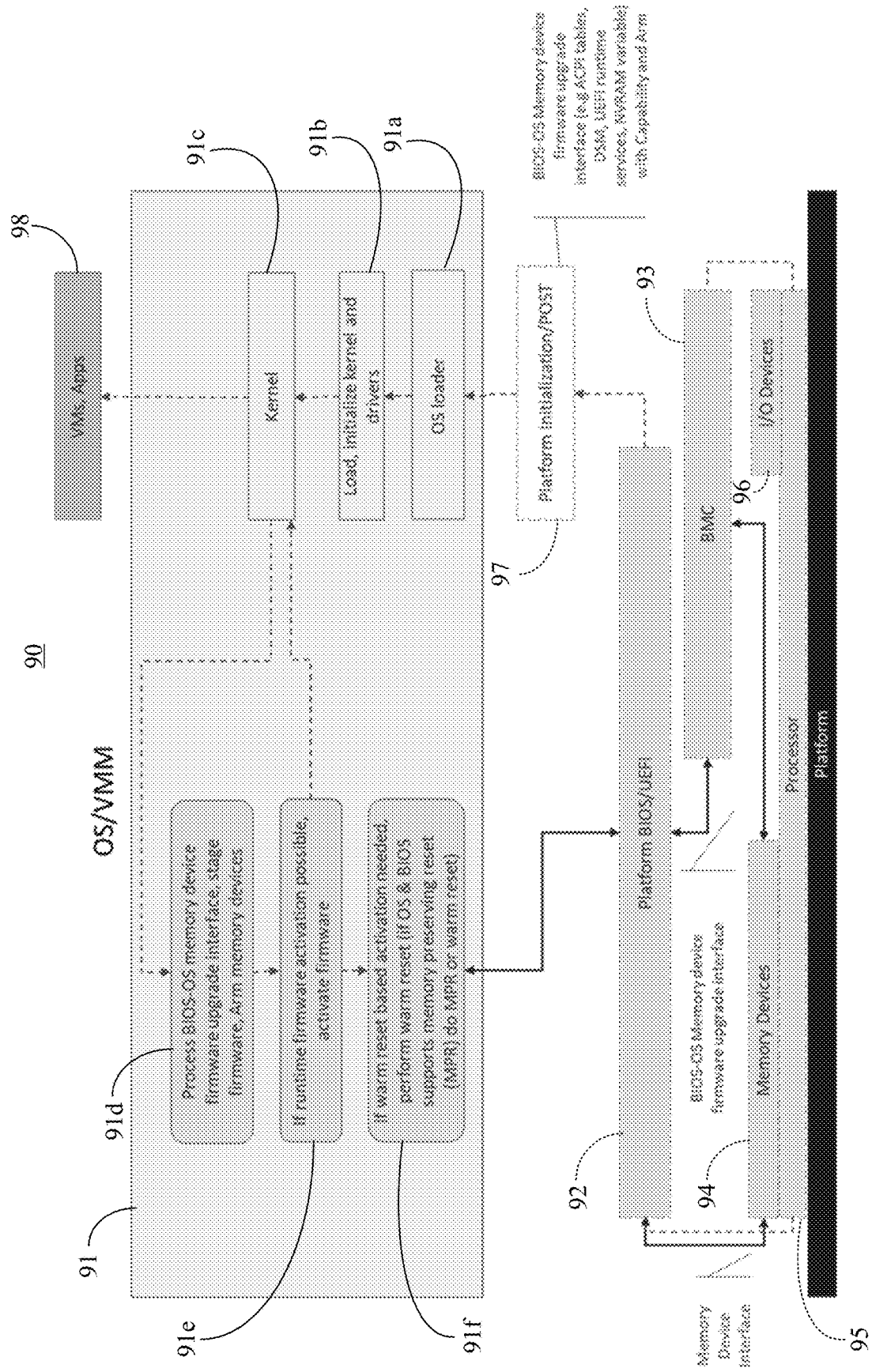
FIG. 6 is a block diagram of an example of a BIOS-OS (basic input output system to OS) interface for memory device firmware updates according to an embodiment.

In the proposed solution 90, as shown in FIG. 6, the BIOS 92 provides a simple interface to the OS 91 (91a-91f, e.g., ACPI tables, DSM, UEFI runtime services, UEFI NVRAM variable) and/or VMM (virtual machine monitor, e.g., hypervisor) to present warm reset-based memory device firmware upgrade capabilities and arming memory devices for firmware upgrade. The arm mechanism (e.g., selected devices or all or none) allows for compatibility with existing warm reset capability (e.g., no firmware upgraded) or to allow firmware upgrade.

In the illustrated example, the BIOS 92 communicates with a BMC 93, memory devices 94, and a processor 95 that is coupled to I/O devices 96. The BIOS may also issue a platform initialization 97 (e.g., power on self-test/POST) message to the OS 91. In an embodiment, an OS loader 91a uses the platform initialization message 97 to trigger a procedure 91b that loads and initializes a kernel 91c. The illustrated kernel 91c triggers a block 91d to process a BIOS-OS memory device firmware interface, stage the firmware, and arm the memory devices. Block 91e may activate the firmware if runtime firmware activation is possible and return to the kernel 91c. If warm reset based activation is to be conducted, block 91f performs the warm reset. If the OS 91 and BIOS 92 support memory preserving reset (MPR), either an MPR or warm reset are conducted at block 91f. In an embodiment, the kernel 91c is also in communication with one or more virtual machines (VMs) and/or applications 98.

Figure 7A:
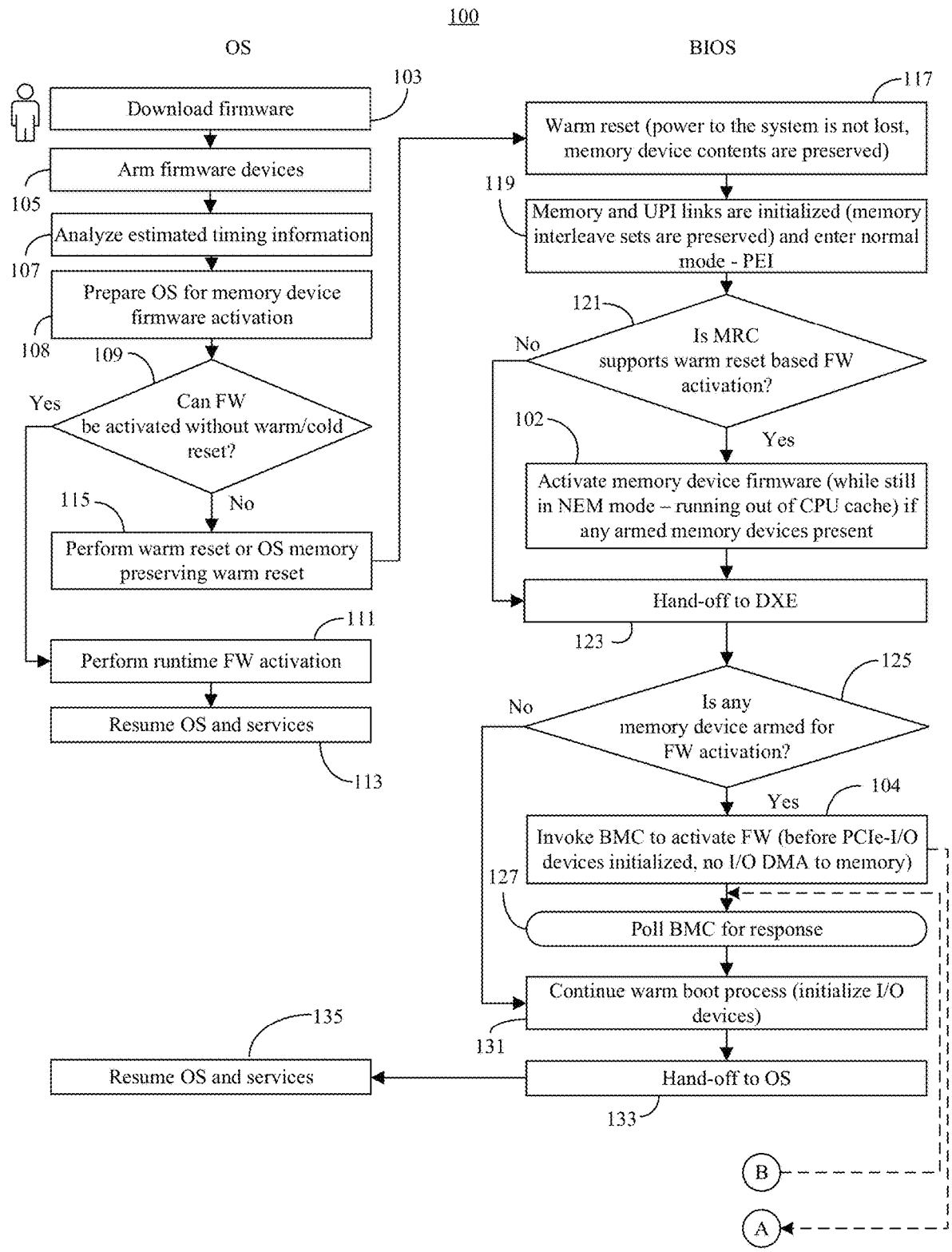
FIGS. 7A-7B are a flowchart of an example of a method of conducting a runtime upgrade of memory device firmware via a warm reset according to an embodiment.
Figure 7B:
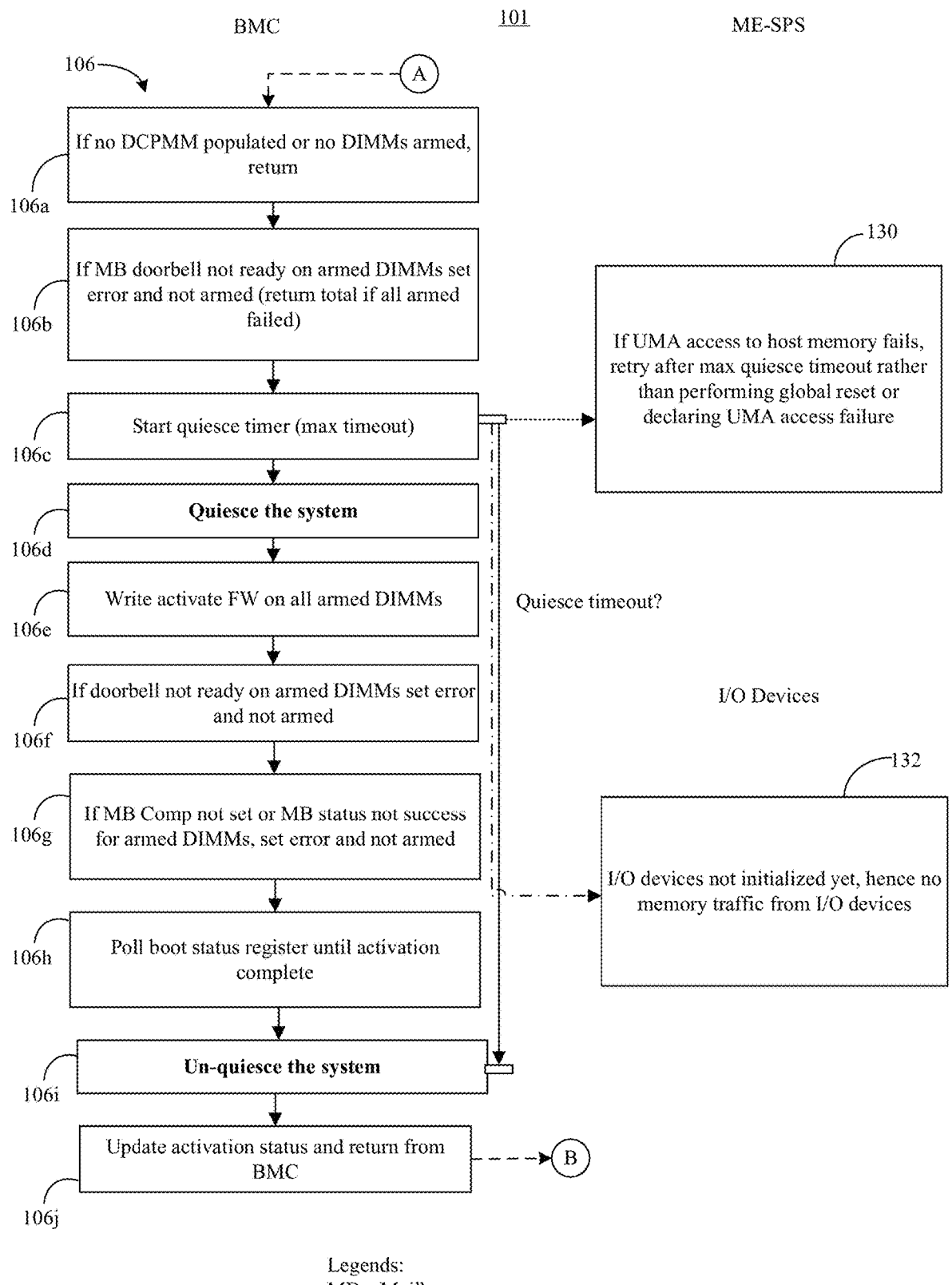

Once the firmware is staged (through in-band or OOB interface) on the memory devices, memory devices are armed to upgrade firmware by performing a warm reset (either OS memory preserving or normal warm reset). FIGS. 7A-7B outline the BIOS and BMC (baseboard management controller) flows 100, 101 for activating new memory device firmware.

Once a warm reset is performed, the processor fetches the reset BIOS code and executes memory and processor to processor interconnect such as INTEL Ultra Path Interconnect (UPI) initialization. There are couple of options to enable memory device firmware in the warm reset flow before I/O devices are enabled to make memory access.

Option 1:
If the memory initialization code also known as Memory Reference Code (MRC) is capable of performing arm decode and activating new memory device firmware (if firmware is already staged), once the normal mode is reached in MRC, before closing Non-Eviction Mode (NEM, where MRC code runs out of processor cache), the MRC can communicate with the memory devices and processing block 102 activates the firmware. Here there is no I/O device enablement to use the system memory.

Thus, Option 1 is one example of performing the firmware activation before I/O device DMA access is enabled. In fact, this activation could be conducted before starting memory initialization or after conducting the memory initialization but before running out of (e.g., executing from) memory. The use of NEM mode or MRC to activate the firmware are therefore techniques to activate the firmware before running out of memory. Another approach includes executing from flash and before NEM is initialized, communicating with the DIMM to activate the firmware.

Option 2:
Once out of MRC/UPI RC code, normally in the DXE (driver execution environment), before initializing I/O devices, a DXE driver can call in block 104 a microcontroller such as, for example, the BMC, system management controller, security controller, power management controller, etc., to activate the new firmware. In illustrated blocks 106 (106a-106j), the BMC code in-turn performs quiesce and communicates with the memory devices to activate the firmware. The reason for quiesce is BIOS executing out of memory results in memory accesses to the memory devices and if ME-SPS (manageability engine server platform services) can access the host memory, the ME-SPS may generate memory accesses. Once the BMC completes the memory device firmware activation, the BIOS can continue to boot the system normally for warm boot or OS memory preserving warm boot.

Even though embodiments described herein include details for memory device firmware updates (PMem in particular), other firmware upgrades such as microcode upgrade or part of the BIOS upgrade are possible using similar flow outlined above. The DRAM device might have firmware in the DIMM, and a similar approach may be used for upgrade.

More particularly, illustrated OS block 103 detects a user (e.g., customer, developer) request to download firmware and block 105 arms the firmware devices. In an embodiment, block 107 analyzes estimated timing information and block 108 prepares the OS for memory device firmware activation. A determination may be made at block 109 as to whether FW can be activated without a warm/cold reset. If so, block 111 performs a runtime FW activation and block 113 resumes OS and services. If it is determined at block 109 that FW cannot be activated without a warm/cold reset, block 115 may trigger a warm reset or OS memory preserving warm reset.

Illustrated BIOS block 117 conducts a warm reset, wherein power to the system is not lost and memory device contents are preserved. Block 119 may initialize memory and UPI links (e.g., memory interleave sets are preserved) and enter normal mode (e.g., pre-extensible firmware interface initialization/PEI). In an embodiment, block 121 determines whether the MRC supports warm reset based FW activation. If so, block 102 may activate the memory device firmware (e.g., while still in NEM mode—running out of CPU cache) if any armed memory devices are present. Additionally, block 123 may conduct a hand-off to DXE. If it is determined at block 121 that the MRC does not support warm reset based FW activation, the illustrated BIOS procedure bypasses block 102 and proceeds directly to block 123.

In one example, a determination is made at block 125 as to whether there is any memory device armed for FW activation. If so, illustrated block 104 invokes the BMC to activate the FW (e.g., before PCIe-I/O devices are initialized, with no I/O DMA to memory). In an embodiment, block 127 polls the BMC for a response and block 131 continues the warm boot process (e.g., initializing I/O devices). If it is determined at block 125 that there are no memory devices armed for activation, the BIOS procedure bypasses blocks 104 and 127, and proceeds directly to block 131. BIOS block 133 conducts a hand-off to the OS and OS block 135 resumes OS and services.

BMC blocks 106 accept control from block 104, where block 106a returns if no DCPMM is populated or no DIMMs are armed. If the MB (mailbox) doorbell is not ready on armed DIMMS, block 106b sets an error and a not armed state (e.g., returning the total if all armed have failed). In one example, block 106c starts a quiesce timer (e.g., maximum timeout), where block 106d quiesces the system. In an embodiment, block 106e write activates FW on all armed DIMMS. If the doorbell is not ready on armed DIMMS, block 106f sets an error and a not armed state. Additionally, if the MB compatibility is not set or the MB status is not successful for armed DIMMS, block 106g may set an error and a not armed state. In an embodiment, block 106h polls a boot status register until activation is complete. Block 106i may un-quiesce the system, where block 106j updates the activation status and returns control from the BMC to block 127. If UMA (unified memory architecture) access to host memory fails, ME-SPS block 130 may retry after a maximum quiesce timeout rather than performing a global reset or declaring a UMA access failure. Additionally, if a quiesce timeout occurs, I/O device block 132 ensures that I/O devices are not initialized yet (e.g., no memory traffic from I/O devices).

FIG. 8A shows a method 110 of operating a performance-enhanced computing system. The method 110 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 112 provides for exchanging activation information between system firmware and an OS in a computing system, wherein the activation information includes one or more of status information, activation state information, capability information, activation time information or quiesce time information. In an embodiment, the status information indicate a last firmware activation status, the activation state information indicates a firmware activation arm state, and the capability information indicates a warm reset capability. Additionally, the activation time information may indicate an estimated firmware activation time and the quiesce time information may indicate an estimated quiesce time. Block 114 conducts a runtime upgrade of memory device firmware based on the activation information, wherein the runtime upgrade bypasses a reboot of the computing system. In one embodiment, the runtime upgrade is conducted via a warm reset.

FIG. 8B shows a method 120 of conducting a warm reset. The method 120 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 122 provides for determining whether a memory reference code (MRC, e.g., memory initialization code) associated with a computing system supports warm resets. If block 124 indicates that warm resets are supported, block 126 may activate, by a basic input output system (BIOS), the device firmware in non-eviction mode (NEM). In an embodiment, the NEM includes/involves execution of the MRC out of a processor cache. If block 124 indicates that warm resets are not supported, block 128 may invoke a microcontroller such as, for example, a baseboard management controller (BMC), system management controller, security controller, power management controller, etc., or any combination thereof, to activate the device firmware. In one example, the microcontroller quiesces the computing system. Illustrated block 129 executes the device firmware from the memory device (e.g., after the device firmware is activated).

Figure 9:
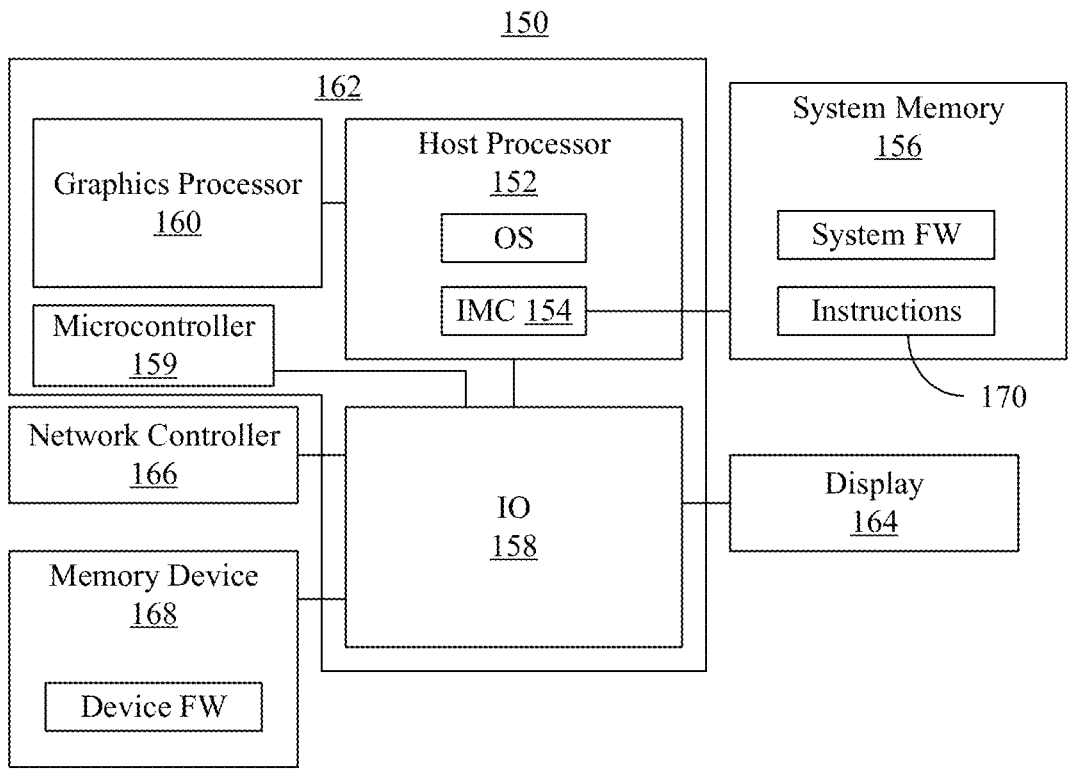
FIG. 9 is a block diagram of an example of a computing system according to an embodiment.

FIG. 9 shows a computing system 150 including executable program instructions 170, which when executed by one or more of a host processor 152, a graphics processor 160, a microcontroller 159 (e.g., BMC, system management controller, security controller, power management controller, etc.) or an input/output module (IO) 158, cause the computing system 150 to perform one or more aspects of the methods illustrated in FIGS. 2, 7, 8A and/or 8B, already discussed. In an embodiment, the instructions 170 are retrieved from system memory 156 (e.g., dual inline memory module/DIMM). Additionally, the graphics processor 160, the host processor 152, the microcontroller 159 and/or the 10 module 158 are incorporated into a system on chip (SoC) 162, which is also coupled to a display 164 and/or a network controller 166 (wireless, wired).

Figure 10:
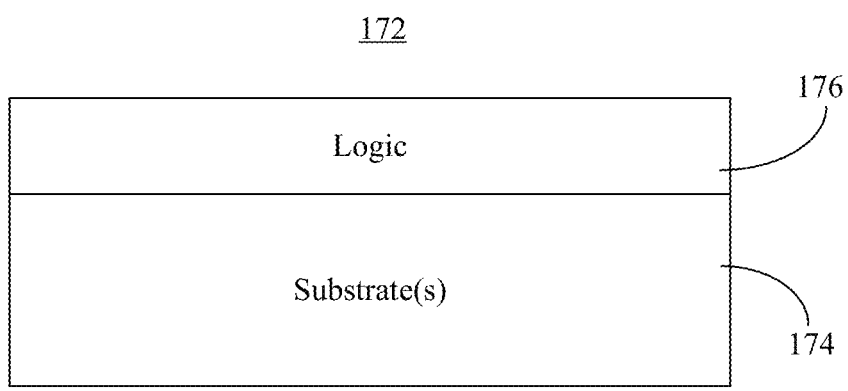
FIG. 10 is an illustration of an example of a semiconductor apparatus according to an embodiment.

FIG. 10 shows a semiconductor package apparatus 172. The illustrated apparatus 172 includes one or more substrates 174 (e.g., silicon, sapphire, gallium arsenide) and logic 176 (e.g., transistor array and other integrated circuit/IC components) coupled to the substrate(s) 174. The logic 176 may be implemented at least partly in configurable logic or fixed-functionality logic hardware. In one example, the logic 176 implements one or more aspects of the methods illustrated in FIGS. 2, 7, 8A and/or 8B.

In one example, the logic 176 includes transistor channel regions that are positioned (e.g., embedded) within the substrate(s) 174. Thus, the interface between the logic 176 and the substrate(s) 174 may not be an abrupt junction. The logic 176 may also be considered to include an epitaxial layer that is grown on an initial wafer of the substrate(s) 174.

Figure 11:
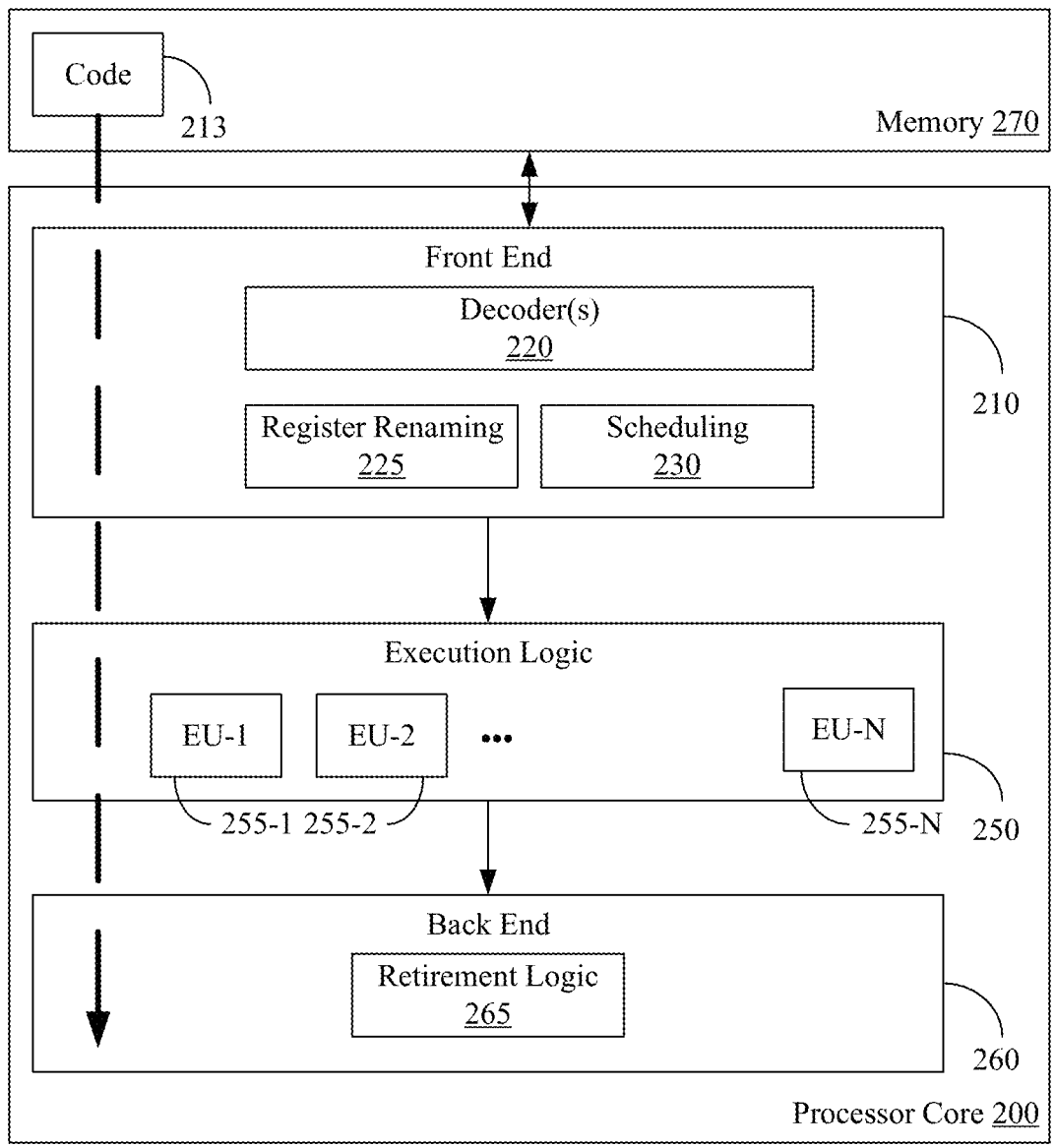
FIG. 11 is a block diagram of an example of a processor according to an embodiment.

FIG. 11 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 11, a processing element may alternatively include more than one of the processor core 200 illustrated in FIG. 11. The processor core 200 may be a single-threaded core or, for at least one embodiment, the processor core 200 may be multithreaded in that it may include more than one hardware thread context (or "logical processor") per core.

FIG. 11 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement one or more aspects of the methods illustrated in FIGS. 2, 7, 8A and/or 8B, already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 11, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 12:
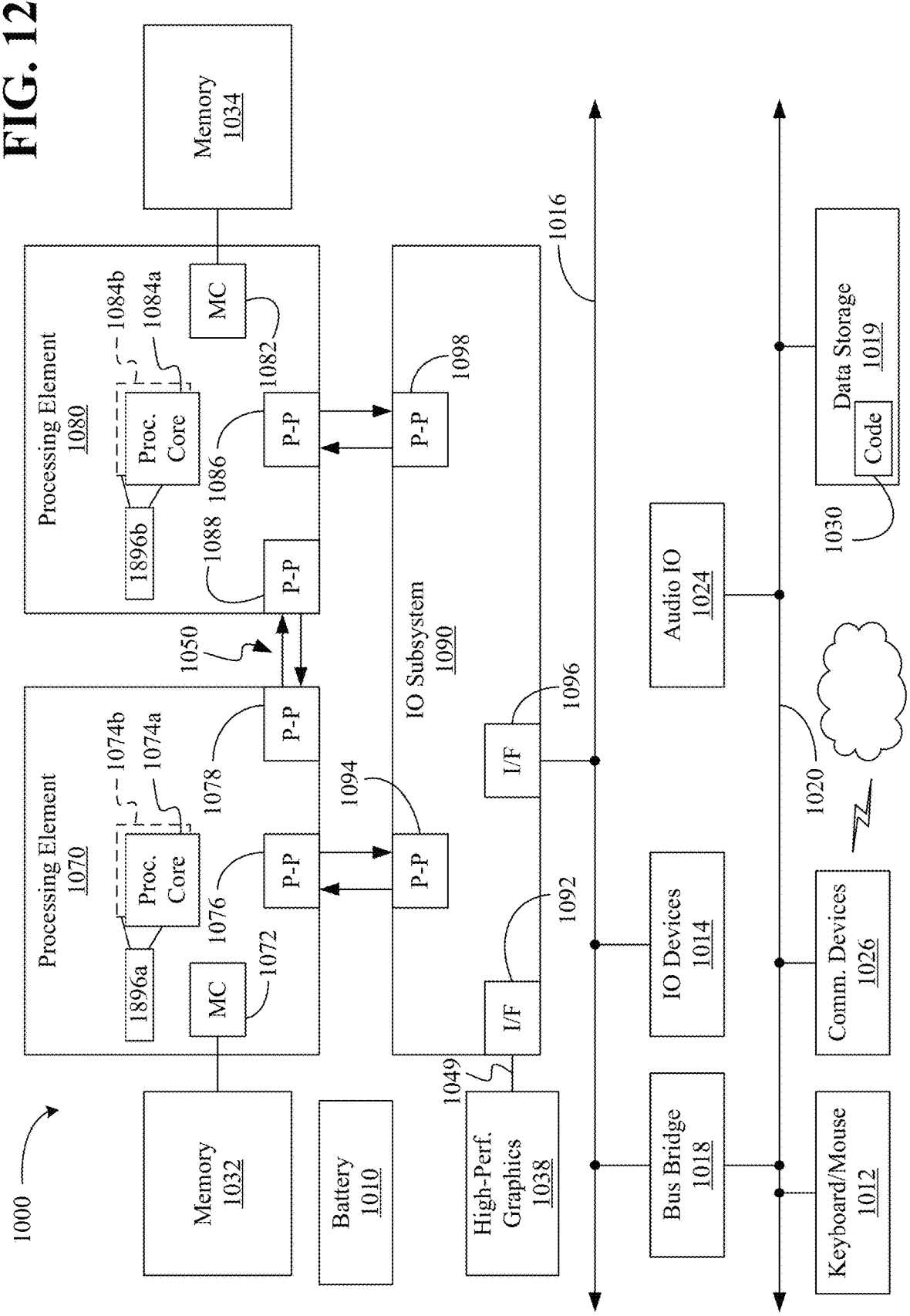
FIG. 12 is a block diagram of an example of a multi-processor based computing system according to an embodiment.

Referring now to FIG. 12, shown is a block diagram of a computing system 1000 embodiment in accordance with an embodiment. Shown in FIG. 12 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 12 may be implemented as a multi-drop bus rather than point-to-point interconnect.

As shown in FIG. 12, each of processing elements 1070 and 1080 may be multicore processors, including first and second processor cores (i.e., processor cores 1074*a* and 1074*b* and processor cores 1084*a* and 1084*b*). Such cores 1074*a*, 1074*b*, 1084*a*, 1084*b* may be configured to execute instruction code in a manner similar to that discussed above in connection with FIG. 11.

Each processing element 1070, 1080 may include at least one shared cache 1896*a*, 1896*b*. The shared cache 1896*a*, 1896*b* may store data (e.g., instructions) that are utilized by one or more components of the processor, such as the cores 1074*a*, 1074*b* and 1084*a*, 1084*b*, respectively. For example, the shared cache 1896*a*, 1896*b* may locally cache data stored in a memory 1032, 1034 for faster access by components of the processor. In one or more embodiments, the shared cache 1896*a*, 1896*b* may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 12, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 12, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 12, various I/O devices 1014 (e.g., biometric scanners, speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement one or more aspects of the methods illustrated in FIGS. 2, 7, 8A and/or 8B, already discussed. Further, an audio I/O 1024 may be coupled to second bus 1020 and a battery 1010 may supply power to the computing system 1000.

Note that other embodiments are contemplated. For example, instead of the point-to-point architecture of FIG. 12, a system may implement a multi-drop bus or another such communication topology. Also, the elements of FIG. 12 may alternatively be partitioned using more or fewer integrated chips than shown in FIG. 12.

Additional Notes and Examples

Example 1 includes a performance-enhanced computing system comprising a network controller, a processor coupled to the network controller, a memory device coupled to the processor, the memory device including device firmware, and a system memory coupled to the processor, the system memory including a set of executable program instructions, which when executed by the processor, cause the computing system to exchange activation information between system firmware and an operating system (OS), wherein the activation information includes one or more of status information, activation state information, capability information, activation time information or quiesce time information and conduct a runtime upgrade of the device firmware based on the activation information, wherein the runtime upgrade bypasses a reboot of the computing system.

Example 2 includes the computing system of Example 1, wherein the runtime upgrade is conducted via a warm reset, the status information is to indicate a last firmware activation status, the activation state information is to indicate a firmware activation arm state, the capability information is to indicate a warm reset capability, the activation time information is to indicate an estimated firmware activation time, and the quiesce time information is to indicate an estimated quiesce time.

Example 3 includes the computing system of Example 2, further including a microcontroller, wherein the instructions, when executed, further cause the processor to determine whether memory initialization code associated with the computing system supports warm resets, activate, by a basic input output system (BIOS), the device firmware if the memory initialization code supports warm resets, and invoke a microcontroller to activate the device firmware if the memory initialization code does not support warm resets, wherein the device firmware is to be activated before being executed from the memory device.

Example 4 includes the computing system of Example 3, wherein the device firmware is to be activated before input/output (I/O) devices are enabled to access the memory device.

Example 5 includes the computing system of Example 3, wherein the microcontroller is to quiesce the computing system, and wherein the microcontroller includes one or more of a baseboard management controller, a system management controller, a security controller or a power management controller.

Example 6 includes the computing system of Example 1, wherein the OS is to prepare to activate the device firmware with quiesce, and wherein once activation of the device firmware is completed, the OS is to re-evaluate a timer so that an OS time and a wall clock time are in sync.

Example 7 includes the computing system of any one of Examples 1 to 6, wherein the OS is to perform input/output (I/O) access to host memory quiesce by one or more of a disablement of direct memory access (DMA), a pause of I/O devices, or a hibernation of I/O devices to conduct a runtime activation of the device firmware.

Example 8 includes a semiconductor apparatus comprising one or more substrates, and logic coupled to the one or more substrates, wherein the logic is implemented at least partly in one or more of configurable logic or fixed-functionality hardware logic, the logic coupled to the one or more substrates to exchange activation information between system firmware and an operating system (OS), wherein the activation information includes one or more of status information, activation state information, capability information, activation time information or quiesce time information, and conduct a runtime upgrade of device firmware based on the activation information, wherein the runtime upgrade bypasses a reboot of a computing system.

Example 9 includes the apparatus of Example 8, wherein the runtime upgrade is to be conducted via a warm reset, the status information is to indicate a last firmware activation status, the activation state information is to indicate a firmware activation arm state, the capability information is to indicate a warm reset capability, the activation time information is to indicate an estimated firmware activation time, and the quiesce time information is to indicate an estimated quiesce time.

Example 10 includes the apparatus of Example 9, wherein the logic coupled to the one or more substrates is to determine whether memory initialization code associated with the computing system supports warm resets, activate, by a basic input output system (BIOS), the device firmware if the memory initialization code supports warm resets, and invoke a microcontroller to activate the device firmware if the memory initialization code does not support warm resets, wherein the device firmware is to be activated before being executed from the memory device.

Example 11 includes the apparatus of Example 10, wherein the device firmware is to be activated before input/output (I/O) devices are enabled to access the memory device.

Example 12 includes the apparatus of Example 10, wherein the microcontroller is to quiesce the computing system, and wherein the microcontroller is to include one or more of a baseboard management controller, a system management controller, a security controller or a power management controller.

Example 13 includes the apparatus of Example 8, wherein the OS is to prepare to activate the device firmware with quiesce, and wherein once activation of the device firmware is completed, the OS is to re-evaluate a timer so that an OS time and a wall clock time are in sync.

Example 14 includes the apparatus of any one of Examples 8 to 13, wherein the OS is to perform input/output (I/O) access to host memory quiesce by one or more of a disablement of direct memory access (DMA), a pause of I/O devices, or a hibernation of I/O devices to conduct a runtime activation of the device firmware.

Example 15 includes the apparatus of any one of Examples 8 to 13, wherein the logic coupled to the one or more substrates includes transistor channel regions that are positioned within the one or more substrates.

Example 16 includes at least one computer readable storage medium comprising a set of executable program instructions, which when executed by a computing system, cause the computing system to exchange activation information between system firmware and an operating system (OS), wherein the activation information includes one or more of status information, activation state information, capability information, activation time information or quiesce time information, and conduct a runtime upgrade of device firmware based on the activation information, wherein the runtime upgrade bypasses a reboot of a computing system.

Example 17 includes the at least one computer readable storage medium of Example 16, wherein the runtime upgrade is to be conducted via a warm reset, the status information is to indicate a last firmware activation status, the activation state information is to indicate a firmware activation arm state, the capability information is to indicate a warm reset capability, the activation time information is to indicate an estimated firmware activation time, and the quiesce time information is to indicate an estimated quiesce time.

Example 18 includes the at least one computer readable storage medium of Example 17, wherein the instructions, when executed, further cause the computing system to determine whether memory initialization code associated with the computing system supports warm resets, activate, by a basic input output system (BIOS), the device firmware if the memory initialization code supports warm resets, and invoke a microcontroller to activate the device firmware if the memory initialization code does not support warm resets, wherein the device firmware is to be activated before being executed from the memory device.

Example 19 includes the at least one computer readable storage medium of Example 18, wherein the device firmware is to be activated before input/output (I/O) devices are enabled to access the memory device.

Example 20 includes the at least one computer readable storage medium of Example 18, wherein the microcontroller is to quiesce the computing system, and wherein the microcontroller is to include one or more of a baseboard management controller, a system management controller, a security controller or a power management controller.

Example 21 includes the at least one computer readable storage medium of Example 17, wherein the OS is to prepare to activate the device firmware with quiesce, and wherein once activation of the device firmware is completed, the OS is to re-evaluate a timer so that an OS time and a wall clock time are in sync.

Example 22 includes the at least one computer readable storage medium of any one of Examples 17 to 21, wherein the OS is to perform input/output (I/O) access to host memory quiesce by one or more of a disablement of direct memory access (DMA), a pause of I/O devices, or a hibernation of I/O devices to conduct a runtime activation of the device firmware.

Example 23 includes a method of operating a performance-enhanced computing system, the method comprising exchanging activation information between system firmware and an operating system (OS), wherein the activation information includes one or more of status information, activation state information, capability information, activation time information or quiesce time information, and conducting a runtime upgrade of device firmware based on the activation information, wherein the runtime upgrade bypasses a reboot of a computing system.

Example 24 includes the method of Example 23, wherein the runtime upgrade is conducted via a warm reset, the status information indicates a last firmware activation status, the activation state information indicates a firmware activation arm state, the capability information indicates a warm reset capability, the activation time information indicates an estimated firmware activation time, and the quiesce time information indicates an estimated quiesce time.

Example 25 includes the method of Example 24, further including determining whether memory initialization code associated with the computing system supports warm resets, activating, by a basic input output system (BIOS), the device firmware if the memory initialization code supports warm resets, and invoking a microcontroller to activate the device firmware if the memory initialization code does not support warm resets, wherein the device firmware is activated before being executed from the memory device.

Example 26 includes the method of Example 25, wherein the device firmware is activated before input/output (I/O) devices are enabled to access the memory device.

Example 27 includes the method of Example 25, wherein the microcontroller quiesces the computing system, and wherein the microcontroller includes one or more of a baseboard management controller, a system management controller, a security controller or a power management controller.

Example 28 includes the method of Example 24, wherein the OS prepares to activate the device firmware with quiesce, and wherein once activation of the device firmware is completed, the OS re-evaluates a timer so that an OS time and a wall clock time are in sync.

Example 29 includes the method of any one of Examples 23 to 28, wherein the OS performs input/output (I/O) access to host memory quiesce by one or more of a disablement of direct memory access (DMA), a pause of I/O devices, or a hibernation of I/O devices to conduct a runtime activation of the device firmware.

Example 30 includes a computing system comprising a microcontroller, a network controller, a processor coupled to the network controller, and a memory device coupled to the processor, the memory device including device firmware, and a system memory coupled to the processor, the system memory including a set of executable program instructions, which when executed by the processor, cause the processor to determine whether memory initialization code associated with the computing system supports warm resets, activate, by a basic input output system (BIOS), the device firmware if the memory initialization code supports warm resets, and invoke a microcontroller to activate the device firmware if the memory initialization code does not support warm resets, wherein the device firmware is to be activated before being executed from the memory device.

Example 31 includes the computing system of Example 30, wherein the device firmware is to be activated before input/output (I/O) devices are enabled to access the memory device.

Example 32 includes the computing system of any one of Examples 30 to 31, wherein the microcontroller is to quiesce the computing system, and wherein the microcontroller includes one or more of a baseboard management controller, a system management controller, a security controller or a power management controller.

Example 33 includes a semiconductor apparatus comprising one or more substrates, and logic coupled to the one or more substrates, wherein the logic is implemented at least partly in one or more of configurable logic or fixed-functionality hardware logic, the logic coupled to the one or more substrates to determine whether memory initialization code associated with a computing system supports warm resets, activate, by a basic input output system (BIOS), device firmware if the memory initialization code supports warm resets, and invoke a microcontroller to activate the device firmware if the memory initialization code does not support warm resets, wherein the device firmware is to be activated before being executed from the memory device.

Example 34 includes the apparatus of Example 33, wherein the device firmware is to be activated before input/output (I/O) devices are enabled to access the memory device.

Example 35 includes the apparatus of any one of Examples 33 to 34, wherein the microcontroller is to quiesce the computing system, and wherein the microcontroller is to include one or more of a baseboard management controller, a system management controller, a security controller or a power management controller.

Example 36 includes at least one computer readable storage medium comprising a set of executable program instructions, which when executed by a computing system, cause the computing system to determine whether memory initialization code associated with the computing system supports warm resets, activate, by a basic input output system (BIOS), the device firmware if the memory initialization code supports warm resets, and invoke a microcontroller to activate the device firmware if the memory initialization code does not support warm resets, wherein the device firmware is to be activated before being executed from the memory device.

Example 37 includes the at least one computer readable storage medium of Example 36, wherein the device firmware is to be activated before input/output (I/O) devices are enabled to access the memory device.

Example 38 includes the at least one computer readable storage medium of any one of Examples 36 to 37, wherein the microcontroller is to quiesce the computing system, and wherein the microcontroller is to include one or more of a baseboard management controller, a system management controller, a security controller or a power management controller.

Example 39 includes a method of conducting warm resets, the method comprising determining whether memory initialization code associated with the computing system supports warm resets, activating, by a basic input output system (BIOS), the device firmware if the memory initialization code supports warm resets, and invoking a microcontroller to activate the device firmware if the memory initialization code does not support warm resets, wherein the device firmware is activated before being executed from the memory device.

Example 40 includes the method of Example 39, wherein the device firmware is activated before input/output (I/O) devices are enabled to access the memory device.

Example 41 includes the method of any one of Examples 39 to 40, wherein the microcontroller quiesces the computing system, and wherein the microcontroller includes one or more of a baseboard management controller, a system management controller, a security controller or a power management controller.

Example 42 includes means for performing the method of any one of Examples 23 to 29.

Example 43 includes means for performing the method of any one of Examples 39 to 41.

Embodiments provide a clearly visible platform firmware to OS interface through ACPI Device Specific Module (DSM) mechanism. In addition to the memory device implementing the building blocks for the interface, the platform firmware and OS may support these interfaces and actions. Platform firmware (BIOS/UEFI) provided OS interface with constructs described in this disclosure. Some embodiments use the DSM mechanism, but the use of ACPI tables and driver mechanisms is also possible. Those embodiments may be clearly visible by dumping the ACPI tables/DSM or proprietary driver interfaces. Additionally, product feature documentation may provide the use of runtime memory device firmware update technology. If the product literature calls out support for runtime upgrade of memory devices, it is possible that one or more embodiments are being used. For example, memory device firmware upgrade capability, quiesce being needed or not, estimated time for firmware upgrade being exchange, etc., may indicate use of the technology described herein.

With regard to warm resets, embodiments alter the BIOS warm boot flow to invoke memory device firmware activation. Typically, on warm boot, no new firmware will be activated. If the product includes firmware upgrade in the warm boot path, especially for the memory devices, it may include the technology described herein. The system product feature sets may also include the memory device firmware upgrade without system reboot (OS memory loss). The BIOS Writers Guide (BWG) may include a boot flow to comprehend warm reset-based memory device firmware activation. Moreover, BMC interface details may include the memory device firmware activation information.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A computing system comprising:
a network controller;
a processor coupled to the network controller;
a memory device coupled to the processor, the memory device including device firmware; and
a system memory coupled to the processor, the system memory including a set of executable program instructions, which when executed by the processor, cause the processor to:
exchange activation information between system firmware and an operating system (OS), wherein the activation information includes one or more of status information, activation state information, capability information, activation time information or quiesce time information,
conduct a runtime upgrade of the device firmware based on the activation information, wherein the runtime upgrade bypasses a reboot of the computing system,
determine whether memory initialization code associated with the computing system supports warm resets,
activate the device firmware if the memory initialization code supports warm resets, and
invoke a microcontroller to activate the device firmware if the memory initialization code does not support warm resets, wherein the device firmware is to be activated before being executed from the memory device.

2. The computing system of claim 1, wherein the runtime upgrade is to be conducted via a warm reset, the status information is to indicate a last firmware activation status, the activation state information is to indicate a firmware activation arm state, the capability information is to indicate a warm reset capability, the activation time information is to indicate an estimated firmware activation time, and the quiesce time information is to indicate an estimated quiesce time.

3. The computing system of claim 2, further including the microcontroller, wherein to activate the device firmware, the instructions, when executed, further cause the processor to:
activate the device firmware with a basic input output system (BIOS).

4. The computing system of claim 3, wherein the device firmware is to be activated before input/output (I/O) devices are enabled to access the memory device.

5. The computing system of claim 3, wherein the microcontroller is to quiesce the computing system, and wherein the microcontroller includes one or more of a baseboard management controller, a system management controller, a security controller or a power management controller.

6. The computing system of claim 1, wherein the OS is to prepare to activate the device firmware with quiesce, and wherein once activation of the device firmware is completed, the OS is to re-evaluate a timer so that an OS time and a wall clock time are in sync.

7. The computing system of claim 1, wherein the OS is to perform input/output (I/O) access to host memory quiesce by one or more of a disablement of direct memory access (DMA), a pause of I/O devices, or a hibernation of I/O devices to conduct a runtime activation of the device firmware.

8. A semiconductor apparatus comprising:
one or more substrates; and
logic coupled to the one or more substrates, wherein the logic is implemented at least partly in one or more of configurable logic or fixed-functionality hardware logic, the logic coupled to the one or more substrates to:
exchange activation information between system firmware and an operating system (OS), wherein the activation information includes one or more of status information, activation state information, capability information, activation time information or quiesce time information;
conduct a runtime upgrade of device firmware based on the activation information, wherein the runtime upgrade bypasses a reboot of a computing system;
determine whether memory initialization code associated with the computing system supports warm resets;
activate the device firmware if the memory initialization code supports warm resets; and
invoke a microcontroller to activate the device firmware if the memory initialization code does not support warm resets, wherein the device firmware is to be activated before being executed from a memory device.

9. The apparatus of claim 8, wherein the runtime upgrade is to be conducted via a warm reset, the status information is to indicate a last firmware activation status, the activation state information is to indicate a firmware activation arm state, the capability information is to indicate a warm reset capability, the activation time information is to indicate an estimated firmware activation time, and the quiesce time information is to indicate an estimated quiesce time.

10. The apparatus of claim 9, wherein to activate the device firmware, the logic coupled to the one or more substrates is to:
activate the device firmware with a basic input output system (BIOS).

11. The apparatus of claim 10, wherein the device firmware is to be activated before input/output (I/O) devices are enabled to access the memory device.

12. The apparatus of claim 10, wherein the microcontroller is to quiesce the computing system, and wherein the microcontroller is to include one or more of a baseboard management controller, a system management controller, a security controller or a power management controller.

13. The apparatus of claim 8, wherein the OS is to prepare to activate the device firmware with quiesce, and wherein once activation of the device firmware is completed, the OS is to re-evaluate a timer so that an OS time and a wall clock time are in sync.

14. The apparatus of claim 8, wherein the OS is to perform input/output (I/O) access to host memory quiesce by one or more of a disablement of direct memory access (DMA), a pause of I/O devices, or a hibernation of I/O devices to conduct a runtime activation of the device firmware.

15. The apparatus of claim 8, wherein the logic coupled to the one or more substrates includes transistor channel regions that are positioned within the one or more substrates.

16. At least one computer readable storage medium comprising a set of executable program instructions, which when executed by a computing system, cause the computing system to:
exchange activation information between system firmware and an operating system (OS), wherein the activation information includes one or more of status information, activation state information, capability information, activation time information or quiesce time information;
conduct a runtime upgrade of device firmware based on the activation information, wherein the runtime upgrade bypasses a reboot of the computing system;
determine whether memory initialization code associated with the computing system supports warm resets;
activate the device firmware if the memory initialization code supports warm resets; and
invoke a microcontroller to activate the device firmware if the memory initialization code does not support warm resets, wherein the device firmware is to be activated before being executed from a memory device.

17. The at least one computer readable storage medium of claim 16, wherein the runtime upgrade is to be conducted via a warm reset, the status information is to indicate a last firmware activation status, the activation state information is to indicate a firmware activation arm state, the capability information is to indicate a warm reset capability, the activation time information is to indicate an estimated firmware activation time, and the quiesce time information is to indicate an estimated quiesce time.

18. The at least one computer readable storage medium of claim 17, wherein to activate the device firmware, the instructions, when executed, further cause the computing system to:
activate the device firmware with a basic input output system (BIOS).

19. The at least one computer readable storage medium of claim 18, wherein the device firmware is to be activated before input/output (I/O) devices are enabled to access the memory device.

20. The at least one computer readable storage medium of claim 18, wherein the microcontroller is to quiesce the computing system, and wherein the microcontroller is to include one or more of a baseboard management controller, a system management controller, a security controller or a power management controller.

21. The at least one computer readable storage medium of claim 17, wherein the OS is to prepare to activate the device firmware with quiesce, and wherein once activation of the device firmware is completed, the OS is to re-evaluate a timer so that an OS time and a wall clock time are in sync.

22. The at least one computer readable storage medium of claim 17, wherein the OS is to perform input/output (I/O) access to host memory quiesce by one or more of a disablement of direct memory access (DMA), a pause of I/O devices, or a hibernation of I/O devices to conduct a runtime activation of the device firmware.

23. A method comprising:
exchanging activation information between system firmware and an operating system (OS), wherein the activation information includes one or more of status information, activation state information, capability information, activation time information or quiesce time information;
conducting a runtime upgrade of device firmware based on the activation information, wherein the runtime upgrade bypasses a reboot of a computing system;

determining whether memory initialization code associated with the computing system supports warm resets, activating the device firmware if the memory initialization code supports warm resets; and invoking a microcontroller to activate the device firmware if the memory initialization code does not support warm resets, wherein the device firmware is to be activated before being executed from a memory device.

24. The method of claim 23, wherein the runtime upgrade is conducted via a warm reset, the status information indicates a last firmware activation status, the activation state information indicates a firmware activation arm state, the capability information indicates a warm reset capability, the activation time information indicates an estimated firmware activation time, and the quiesce time information indicates an estimated quiesce time.

25. The method of claim 24, wherein the activating further includes:

activating the device firmware with a basic input output system (BIOS).

\* \* \* \* \*